United States Patent [19]
Harig et al.

[11] Patent Number: 5,573,846
[45] Date of Patent: Nov. 12, 1996

[54] POLYFLUOROCARBON COATED METAL BEARING

[75] Inventors: Friedrich Harig, Willich, Germany; Dominique Petit, Blegny, Belgium

[73] Assignee: Norton Pampus GmbH, Worcester, Mass.

[21] Appl. No.: 164,668

[22] Filed: Dec. 8, 1993

Related U.S. Application Data

[63] Continuation of Ser. No. 781,900, Oct. 24, 1991, abandoned.

[51] Int. Cl.$^6$ ........................................... F16C 33/20
[52] U.S. Cl. .......................... 428/323; 428/138; 428/463; 428/141; 428/520; 428/515; 428/522; 428/325; 428/327; 428/329; 428/220; 428/335; 428/473.5; 428/421; 428/422; 384/908; 384/909; 508/104
[58] Field of Search ......................... 428/138, 463, 428/141, 520, 515, 522, 325, 323, 327, 329, 220, 335, 473.5, 421, 422; 384/908, 909; 252/12, 12.2

[56] References Cited

U.S. PATENT DOCUMENTS

| | | | |
|---|---|---|---|
| 3,594,049 | 7/1971 | Turner | 428/327 |
| 3,647,500 | 3/1972 | Mizuno | 428/461 |
| 3,664,888 | 5/1972 | Oga et al. | 148/6.27 |
| 4,156,049 | 5/1979 | Hodes et al. | 428/409 |
| 4,258,089 | 3/1981 | Anderson et al. | 427/194 |
| 4,379,900 | 4/1983 | Sulzbach | 526/247 |
| 4,409,354 | 10/1983 | Namba et al. | 524/431 |
| 4,812,367 | 3/1989 | Bickle | 428/332 |
| 4,897,439 | 1/1990 | Rau et al. | 524/404 |
| 4,914,146 | 4/1990 | Honda et al. | 524/544 |
| 4,978,882 | 12/1990 | Kitani | 310/328 |
| 5,009,959 | 4/1991 | Matsushita et al. | 428/422 |
| 5,024,881 | 6/1991 | Matucha et al. | 428/421 |

FOREIGN PATENT DOCUMENTS 3534242  3/1987  Germany.

OTHER PUBLICATIONS

Fertigungstechnik und Betrieb 23 (1973) vol. 1, pp. 48–49.

Primary Examiner—William Watkins
Attorney, Agent, or Firm—Mary E. Porter; Brian M. Kolkowski

[57] ABSTRACT

A maintenance-free sliding bearing composed of a metal support and a layer which is directly applied thereto and which consists of a copolymer of ethylene-tetrafluoroethylene forming an intermediate layer to which a second sliding layer of plastics is applied.

14 Claims, 1 Drawing Sheet

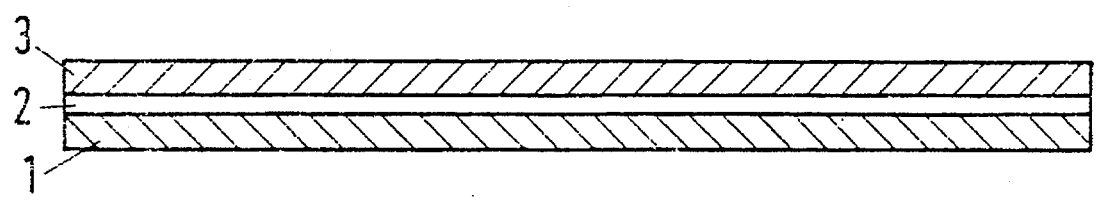

POLYFLUOROCARBON COATED METAL BEARING

This is a continuation of U.S. patent application Ser. No. 07/781,900 filed on Oct. 24, 1991, abandoned.

The invention relates to a novel maintenance-free multilayer sliding bearing.

Maintenance-free sliding bearings comprising a metal support and a plastics layer are known, for example, from DE A 3 534 242 and EP A 0 217 462. Such multilayer sliding bearings consist of a combination of a steel, bronze or high-strength aluminium alloy metal support having a rough base layer, and a sliding layer comprising a polytetrafluoroethylene matrix. The rough base area consists of a porously sinter-fused bronze or iron layer or a layer of an aluminium alloy. The layer then forms the anchoring material for the polytetrafluoroethylene layer to be applied in the form of a paste or for a layer consisting of its copolymers. The highly viscous paste is rolled firm and sintered.

One disadvantage of the aforementioned sliding bearing is its service life, which is inadequate for many applications. Furthermore, it is impossible to re-turn the unevennesses occurring in the deformation of the multilayer material.

If bronze particles are incorporated in the paste to improve the thermal conductivity of the plastics, a property important to the bearing, there is a risk that the outer layer will oxidize during production. Moreover, such a bearing material is not inert. There is more particularly the risk of destruction by acidification. Demixing may also occur when the paste is applied.

"Fertigungstechnik und Betrieb" 23 (1973), Vol. 1, pages 48–49 discloses sheet coating by means of conventional polytetrafluoroethylene. Since this material is completely inert to all adhesives, the sheet is first of all rendered adhesive—i.e., the polytetrafluoroethylene sheets cannot be so applied to a support that they are retained thereon solely by forces of physical adhesion, but the sheets must be attached by means of a glue. In that case, therefore, temperature loadability no longer depends exclusively on the nature of the sheet, but also on the glue used.

DE A 2 401 804 relates to a composite bearing element whose running layer consists substantially of a plastics without fillers. For this purpose use is made of polyarylene sulphides, epoxy resins, polyamide resins, polyester resins, phenoxy resins, polyimide resins, polyamide-imide resins, polypropylene resins and polysulphonic resins. These plastics sheets also are attached to the metal surface either directly, or by means of suitable adhesives. It is also recommended to apply a thin film of lubricating oil to the plastics.

FR C 1 354 161 discloses a tetrafluoroethylene coating having a molybdenum disulphide filling. "Adhesives Age", February 1967, pages 30–34 also mentions metals coated with polytetrafluoroethylene, but the polytetrafluoroethylene is chemically treated, so that a connection to the metal support is made via epoxy groups. Direct application is considered possible only for FEP. It is emphasized that this material is thermoplastic and, unlike tetrafluoroethylene, can be directly applied to metal without an additional connecting layer.

Lastly, it should be pointed out that DE A 3 021 369 discloses granular pourable powders consisting of modified tetrafluoroethylene polymers. These are more particularly a copolymer of perfluoroalkyl vinyl ether of formula: $CF_2=CF-OR_f$, where $R_f$ denotes a perfluoroethyl, perfluoro-n-propyl or perfluoro-n-butyl radical, and tetrafluoroethylene. The polymers are used for ram extrusion, since due to their bulk weight and pourability they are particularly well-suited for automatic metering. There is no mention that this material is suitable for the coating of metal or other materials.

It is an object of the invention to provide a maintenance-free sliding bearing which is also free from the aforementioned disadvantages.

To this end a maintenance-free sliding bearing comprising a metal support and a layer which is directly applied thereto and which consists of a copolymer of perfluoroalkyl vinyl ether having the Formula:

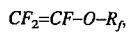

$$CF_2=CF-O-R_f,$$

where $R_f$ denotes a perfluoroethyl, perfluoro-n-propyl or perfluoro-n-butyl, and tetrafluoroethylene, and forms either the sliding layer or an intermediate layer to which a sliding layer of plastics is applied.

The layer of a copolymer of perfluoroalkyl vinyl ether and tetrafluoroethylene has a thickness which is adequate for after-processing. The thickness can be up to 1.5 mm. The layer is applied directly to the smooth or roughened surface of the metal support. Application is performed by the layer of copolymer being pressed over its surface area on to the metal support until the forces of adhesion are strong enough to retain the layer on the metal support. One feature of the invention is therefore that a layer consisting of a copolymer of perfluororalkyl vinyl ether and tetrafluoroethylene can be applied directly to a metal support. The layer can either act directly as a sliding layer or be used as an intermediate layer to which more particularly polytetrafluoroethylene, polyimide or polyether ether ketones (PEEK) adhere well—i.e., the copolymers of perfluororakyl vinyl ether and tetrafluoroethylene must not be rendered adhesive or attached by means of a glue. More particularly temperature loadability, therefore, no longer depends on the glue used.

The preferred metal used for the support is steel. Suitable materials for the sliding layer applied to the layer of a copolymer of perfluoroalkyl vinyl ether and tetrafluoroethylene are plastics, more particularly polytetrafluoroethylene, polyimide or polyether ether ketone (PEEK).

One or more fillers can be added to the layer of a copolymer of perfluoroalkyl vinyl ether and tetrafluoroethylene and/or the plastics sliding layer applied thereto for reinforcement and/or the improvement of thermal conductivity and/or wearing properties. In dependence on the aim in view, more particularly carbon, aluminium oxide, ceramic materials, glass, bronze, molybdenum disulphide or silicon carbide (fabric, powder, balls, fibres) are incorporated.

By silicon carbide particles good thermal conductivity properties are achieved which do not involve the risk of oxidation during production. The silicon carbide particles are also acid-resistant and inexpensive. Moreover, they are lighter than metal particles, more particularly bronze, so that there is no risk of demixing in the production of the layer of a copolymer of perfluoroalkyl vinyl ether and tetrafluoroethylene. In contrast, on the bearing side such fillers should be incorporated as improve the wearing properties of the bearing. The invention allows a proportion of fillers between 1 and 40% by volume, since, in contrast with the prior art, the filler need not be rolled in, but is already present in the layer of a copolymer rate of perfluoroalkyl vinyl ether and tetrafluoroethylene. Particular preference is given to 5 to 30% by volume. The thickness of the layer of a copolymer of perfluoroalkyl vinyl ether and tetrafluoroethylene (up to 1.5 mm) can be adjusted very accurately.

In tests the sliding bearing has withstood continuous operation at temperatures of up to 260° C., in dependence on the material used, without the layer of a copolymer of perfluoroalkyl vinyl ether and tetrafluoroethylene having become loosened. The sliding bearing survived brief higher temperature loadings without damage.

BRIEF DESCRIPTION OF THE DRAWING

The structure of the sliding bearing material according to the invention is illustrated in the drawing, which shows a metal layer 1, a layer 2 of a copolymer of perfluoroalkyl vinyl ether and tetrafluoroethylene and a plastics layer 3 applied thereto.

The invention is explained in greater detail by the following tests.

EXAMPLE 1

Tests with polytetrafluoroethylene and an etched metal support
A steel plate was coated as metal support.

| | |
|---|---|
| Sliding layer: | PTFE + fabric of stainless steel + glass + graphite |
| Thickness of the sliding layer: | 0.48 mm |
| Temperature of the heated plate: | 375–385° C. |
| Pressure of the heated plate: | 0.6–10 MPa |
| Origin of the intermediate layer: | TFM |
| Thickness of the intermediate layer before coating: | 0.25 mm |
| Thickness of the intermediate layer after coating: | about 0.20 mm |

Result of the shearing force test:

| | |
|---|---|
| $\tau = $ N/cm$^2$ | at room temperature |
| $\tau = $ 70 N/cm$^2$ | at 200° C. |

EXAMPLE 2

Tests with an etched and unetched metal support
Steel plate as metal support

| | |
|---|---|
| Thickness of the sample before coating: | 1.10 mm |
| Thickness of the sample after coating: | 1.00 mm |
| Temperature of the heated plate: | 290° C. |
| Pressure of the heated plate: | 0.6–1.0 MPa |
| Intermediate layer used: | ETFE |
| Sliding layer as in Example 1 | |

Results of the sharing force tests:

| Temperature | Etched (N/cm$^2$) | Unetched (N/cm$^2$) |
|---|---|---|
| Room temperature | 133 | 91 |
| 100° C. | 125 | 77 |
| 150° C. | 107 | 62 |
| 200° C. | 58 | 26 |

EXAMPLE 3

Steel plate as metal support

| | |
|---|---|
| Sliding layer: | PTFE filled with 35% carbon as sheet |
| Thickness: | 0.5 mm |
| Intermediate layer: | TFM with 30% SiC |
| Thickness: | 0.25 mm |
| Temperature of the heated plate: | 390° C. |
| Pressure of the heated plate: | 0.2 MPa |

Result of the shearing force tests:

No detachment of the sheet, sheet tears.

EXAMPLE 4

Steel plate as metal support

| | |
|---|---|
| Sliding layer: | TFM + 25% glass + 5% graphite (pressed directly on to steel) |
| Thickness: | 0.25 mm |
| Intermediate layer: | none |
| Temperature of the heated plate: | 380° C. |
| Pressure of the heated plate: | 0.2 MPa |

Result of the shearing force tests:

| | |
|---|---|
| At room temperature: | $\tau = 1500$ N/cm$^2$ |
| At 100° C.: | $\tau = 1080$ N/cm$^2$ |
| At 150° C.: | $\tau = 220$ N/cm$^2$ |

EXAMPLE 5

Steel plate as metal support

| | |
|---|---|
| Sliding layer: | Polyimide |
| Thickness: | 0.125 mm |
| Intermediate layer | TFM (as in Example 1) - sheet |
| Thickness: | 0.25 mm |
| Temperature of the heated plate: | 395° C. |
| Pressure of the heated plate: | 5.0 MPa |

Result of the shearing force tests:

No detachment, foil tears.

EXAMPLE 6

Testing conditions:

| | |
|---|---|
| Size of sample: | 25 × 25 mm |
| Pulling-off force: | 0.1 kg |
| Course of temperature: | increasing 5° C. per stage 3 min rising temperature 3 min holding temperature |
| Sliding layer: | PTFE + bronze fabric |
| Intermediate layer: | TFM sheet |
| Production of the sample: | sliding and intermediate layer were pressed on to a plate (0.5 mm chromated) with 3 t contact pressure. |

Result of the shearing test:

no samples dropped off at 410° C.

In the Examples:
PTFE=polytetrafluoroethylene
TFM=modified polytetrafluoroethylene (=copolymer of perfluoroalkyl vinyl ether and tetrafluoroethylene according to the invention)
ETFE=copolymer of ethylene and tetrafluoroethylene. This is a thermoplastic fluoro polymer
PFA=copolymer of perfluoro vinyl ester and tetrafluoroethylene according to the invention. This product is chemically similar to TFM, but due to its higher ether content it is thermoplastic.

We claim:
1. A maintenance-free sliding bearing comprising a metal support layer, an intermediate layer which is directly applied thereto by pressure and heat and which consists of a copolymer of ethylene—tetrafluoroethylene, and a sliding layer of plastic, wherein the intermediate layer and the sliding layer resist delamination from the metal support layer at shear forces of 77 to 125 N/cm² at 100° C.

2. The sliding bearing of claim 1, wherein the sliding layer is 0.125 to 1.5 mm in thickness.

3. The sliding bearing of claim 1, wherein the metal support layer has a smooth surface.

4. The sliding bearing of claim 1, wherein the metal support layer has a roughened surface.

5. The sliding bearing of claim 1, wherein the metal support layer is made of steel.

6. The sliding bearing of claim 1, wherein the sliding layer is a plastic sheet which is air-permeable.

7. The sliding bearing of claim 1, wherein the sliding layer is selected from the group consisting of polytetrafluoroethylene, polyimide and polyether ketone, and combinations thereof.

8. The sliding bearing of claim 1, wherein at least one filler selected from the group consisting of carbon, graphite, aluminum oxide, ceramic materials, glass, bronze, molybdenum sulphide, and combinations thereof, is added to the sliding layer.

9. The sliding bearing of claim 8, comprising 1 to 40%, by weight, filler.

10. The sliding bearing of claim 9, comprising 5 to 30%, by weight, filler.

11. The sliding bearing of claim 8, wherein at least one filler is added to the sliding layer to improve the sliding bearing in at least one characteristic selected from the group consisting of reinforcement, thermal conductivity, and wear resistance of the sliding bearing.

12. A maintenance-free sliding bearing comprising a metal support layer; an intermediate layer which is directly applied thereto by pressure and heat consisting of a copolymer of ethylene—tetrafluoroethylene, and at least one filler selected from the group consisting of carbon, aluminum oxide, ceramic materials, glass, bronze, molybdenum sulphide, and combinations thereof, and a sliding layer of plastic, wherein the intermediate layer and the sliding layer resist delamination from the metal support layer at shear forces of 77 to 125 N/cm² at 100° C.

13. The sliding bearing of claim 8, wherein the ceramic material is silicon carbide.

14. The sliding bearing of claim 12, wherein the ceramic material is silicon carbide.

* * * * *